(12) United States Patent
Schneider

(10) Patent No.: US 7,918,297 B2
(45) Date of Patent: Apr. 5, 2011

(54) BODY AND FRONT AXLE BEARING FOR A MOTOR VEHICLE

(75) Inventor: Klaus Schneider, Tiefenbronn (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 454 days.

(21) Appl. No.: 10/571,765

(22) PCT Filed: Mar. 10, 2005

(86) PCT No.: PCT/EP2005/002514
§ 371 (c)(1),
(2), (4) Date: Mar. 14, 2006

(87) PCT Pub. No.: WO2005/097535
PCT Pub. Date: Oct. 20, 2005

(65) Prior Publication Data
US 2008/0251038 A1    Oct. 16, 2008

(30) Foreign Application Priority Data

Apr. 6, 2004  (DE) .......................... 10 2004 016 800

(51) Int. Cl.
*B60K 11/04* (2006.01)
*B60K 13/04* (2006.01)
*B60H 1/00* (2006.01)

(52) U.S. Cl. .......................... 180/68.4; 180/309; 165/41

(58) Field of Classification Search ................. 180/65.1, 180/68.4; 280/673, 661, 691
See application file for complete search history.

(56) References Cited

U.S. PATENT DOCUMENTS

| 1,856,772 | A | * | 5/1932 | Masury et al. | 180/68.4 |
| 1,979,191 | A | * | 10/1934 | Burney | 180/68.1 |
| 2,032,876 | A | * | 3/1936 | Haltenberger | 180/292 |
| 2,118,884 | A | * | 5/1938 | Fuchs | 165/253 |
| 2,126,589 | A | * | 8/1938 | Turner | 180/305 |
| 2,231,586 | A | * | 2/1941 | Miller | 180/309 |
| 2,458,231 | A | * | 1/1949 | Weeks | 384/321 |
| 3,339,663 | A | * | 9/1967 | Anderson | 180/304 |
| 3,770,049 | A | * | 11/1973 | Wright | 165/41 |
| 4,140,150 | A | * | 2/1979 | Rundell | 137/340 |
| 4,223,255 | A | * | 9/1980 | Goldman et al. | 318/400.41 |
| 4,771,822 | A | * | 9/1988 | Barbosa | 165/41 |
| 4,913,347 | A | * | 4/1990 | Burst et al. | 236/13 |
| 5,056,601 | A | * | 10/1991 | Grimmer | 165/47 |
| 6,135,065 | A | * | 10/2000 | Weathers et al. | 123/41.31 |

(Continued)

FOREIGN PATENT DOCUMENTS

DE    40 32 433 A1    4/1992

(Continued)

OTHER PUBLICATIONS

International Search Report dated Jun. 27, 2005 (four (4) pages including an English translation of the pertinent portion).

*Primary Examiner* — J. Allen Shriver, II
*Assistant Examiner* — Bridget Avery

(57) ABSTRACT

A motor vehicle chassis and a water-cooled internal combustion engine attached thereto has a cooling system comprising coolant-conducting pipes least one radiator element, and a coolant pump produces forced flow in the cooling circuit. A portion of the cooling pipe system as a distributor pipe module is attached to the vehicle's axle support.

5 Claims, 3 Drawing Sheets

U.S. PATENT DOCUMENTS 6,382,144 B1    5/2002    Schneider

FOREIGN PATENT DOCUMENTS

| | | | |
|---|---|---|---|
| DE | 40 40 378 | A1 | 6/1992 |
| DE | 19943002 | A1 | 4/2001 |
| EP | 0 656 270 | A1 | 6/1995 |
| FR | 2 742 403 | A1 | 6/1997 |
| JP | 2001107731 | A | 4/2001 |
| JP | 2001310640 | A | 11/2001 |

* cited by examiner

BODY AND FRONT AXLE BEARING FOR A MOTOR VEHICLE

BACKGROUND OF THE INVENTION

The present invention relates to a motor vehicle having a chassis, and a front axle support for a motor vehicle.

Water-cooled engine motor vehicles have a cooling conduit system in which at least one radiator element is provided for dissipating heat from the engine. The heat produced by the engine is conveyed by a coolant pump through coolant-conducting pipes to the radiator, and the coolant which is cooled by heat exchange with the air is conveyed, via the coolant tubes forming the return circuit, back to the cooling ducts integrated into the engine housing. In particular for vehicles having rear or mid-engines and radiator elements located in the front, it is necessary to run cooling pipes or attach same to the motor vehicle.

SUMMARY OF THE INVENTION

An object of the present invention is to attach the cooling pipes which are part of the cooling circuit in such a way that the cooling pipes, on one hand, cannot be damaged by moving chassis parts and, on the other hand, can be easily installed.

The foregoing object has been achieved by attaching a portion of the cooling pipe system to an axle support of the motor vehicle. Thereby, these parts can be preinstalled by the system supplier for the axle support. This preinstalled unit for the cooling pipe system may be checked at the same time for leak-tightness, thereby reducing not only the complexity of preinstallation on the assembly line, but also the complexity of reworking.

Further advantageous embodiments and refinements of the motor vehicle and/or the front axle support for a motor vehicle are made possible by the present invention. As the result of providing a forward and return distributor pipe for two radiator elements located in the front part of the motor vehicle—as viewed in the direction of the vehicle—in front of a steering gear attached to the axle support, only two pipes run through the oscillating portions of the axle suspension, thereby reducing possible damage caused by moving chassis parts. Because the forward and return distributor pipes are attached to the front axle support, the complexity of piping may be reduced since the volumetric flow of coolant is not branched off until it is in the vicinity of the radiator.

Pipe clamps into which the cooling pipes may be easily clipped are advantageously attached to the axle support.

Other objects, advantages and novel features of the present invention will become apparent from the following detailed description of the invention when considered in conjunction with the accompanying drawings.

DETAILED DESCRIPTION OF THE DRAWINGS

Figure 1:
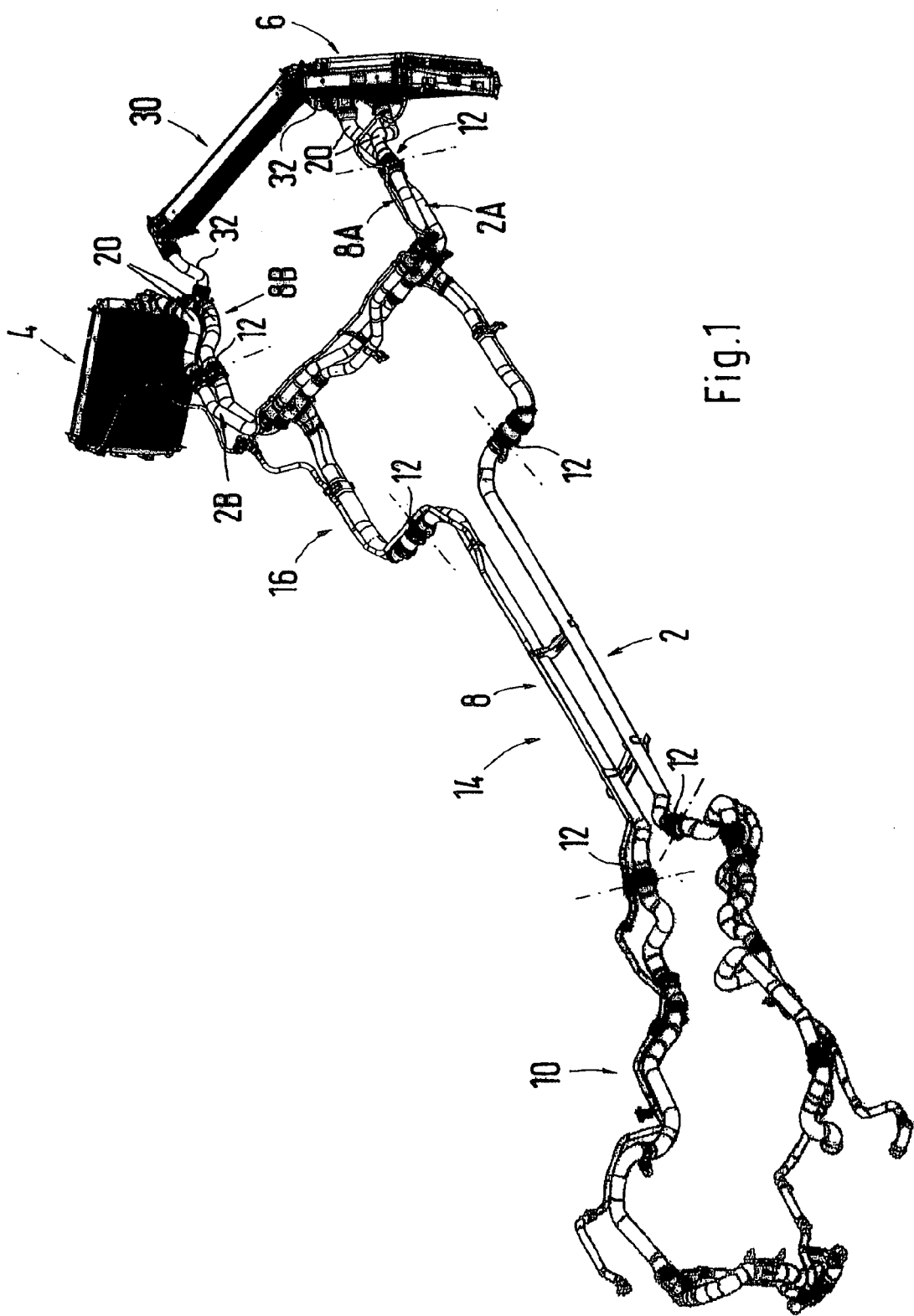
FIG. 1 is a schematic perspective overall view of a cooling system of a motor vehicle.

The cooling pipe system illustrated in FIG. 1 for a motor vehicle having a rear or mid-engine, such as provided in the Porsche 911 or Porsche Boxster sports cars manufactured by the assignee of this application, has a first cooling pipe train 2 which as the forward coolant line leads from the water-cooled engine situated in the rear, via a distributor pipe 2A and 2B, to two radiator elements 4, 6 situated in the front of the motor vehicle. A second cooling pipe train 8 serving as the return line leads through two distributor pipes 8A, 8B, originating from the radiator elements 4, 6, back to the engine, and is likewise connected to the cooling ducts integrated into the engine.

Figure 2:
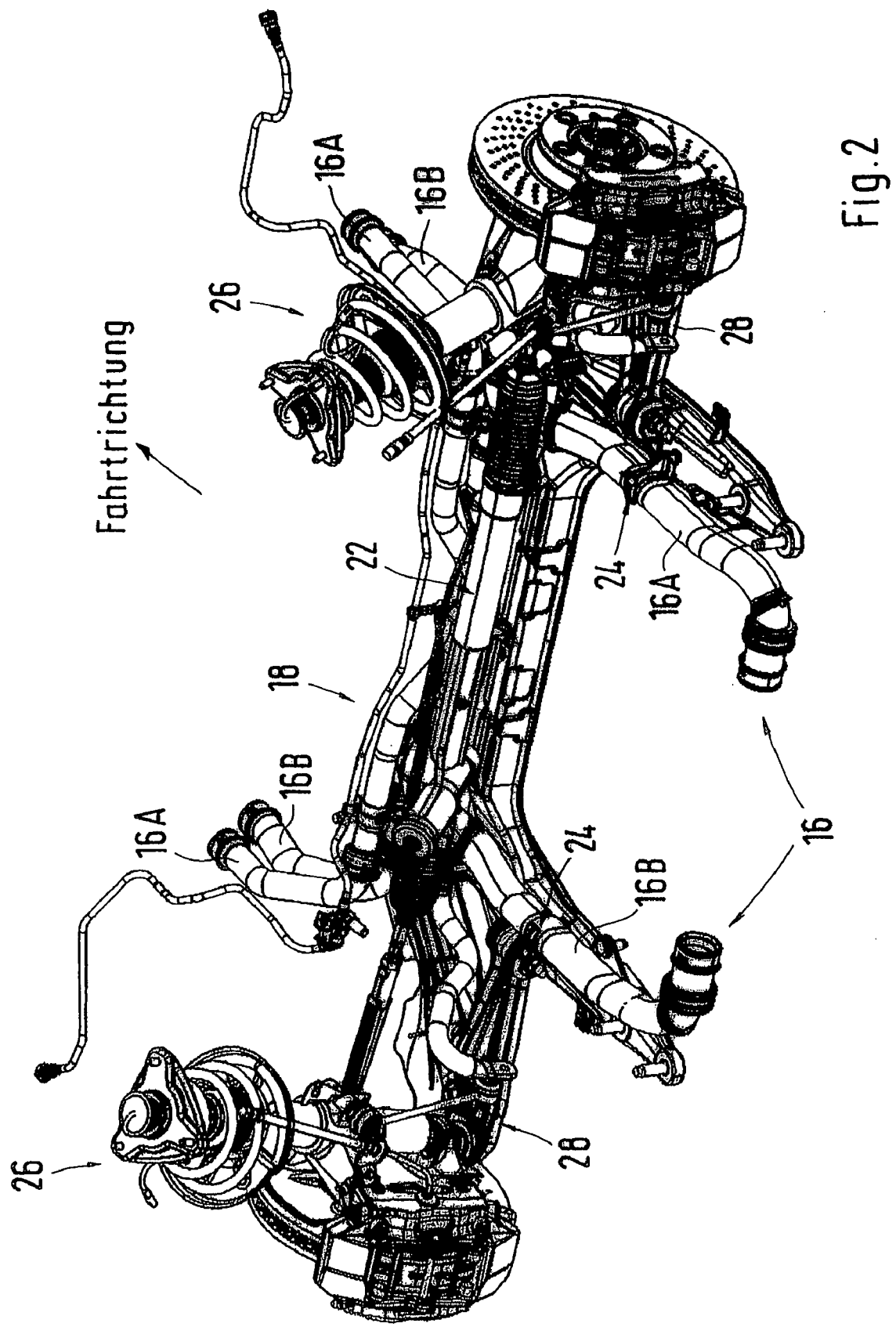
FIG. 2 is a perspective view of a front axle support for a motor vehicle with cooling pipes attached thereto in accordance with the present invention.

The cooling pipe system is composed of a plurality of modules which are appropriately connected by use of quick couplings. Thus, the cooling pipe system viewed from the rear, i.e., from the engine, is composed of a rear end module 10 which is connected via corresponding known quick couplings 12—illustrated by dashed-dotted lines—to a center module, referred to in the following as a tunnel pipe module 14. To this tunnel pipe module 14 is connected a distributor pipe module 16 composed of a forward and return line, which is attached to a front axle support 18 for the motor vehicle as described in greater detail below with reference to FIGS. 2 and 3. Hoses or pipe sections 20 are connected to the distributor pipe module 16 which forms the forward and return line, and are connected to the forward and return line connections for the two radiator elements 4, 6.

Figure 3:
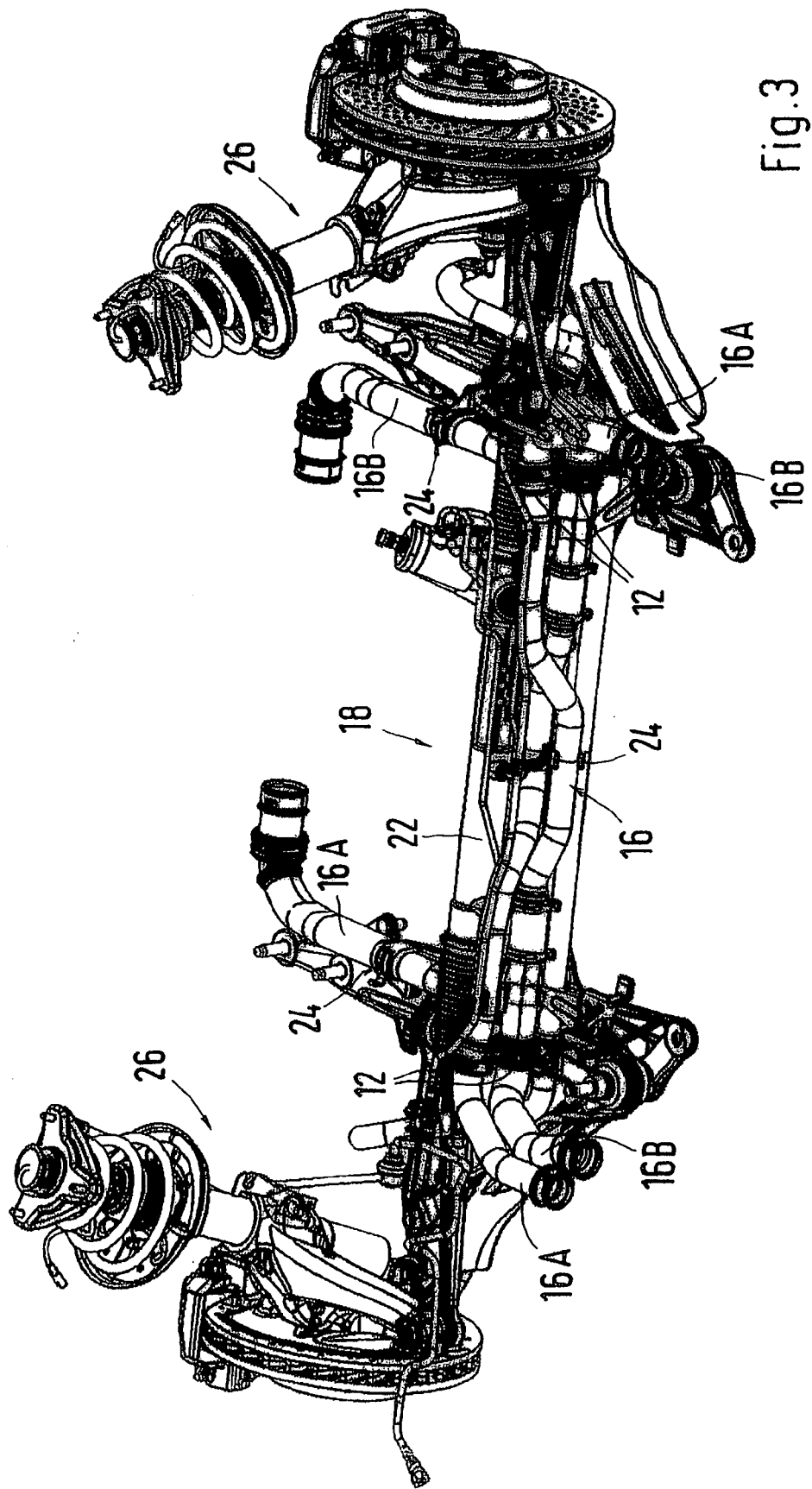
FIG. 3 is another view of the axle support shown in to FIG. 2.

FIG. 3 illustrates the front axle support 18 for the motor vehicle to which the distributor pipe module 16 is preinstalled. As can be seen from FIGS. 2 and 3, the forward and return pipes 16A, 16B are led through a steering gear 22 attached to the front axle support, and thereafter branches off to the two radiator elements 4, 6. The entire distributor pipe module 16 is attached to the front axle support 18 by use of pipe clamps 24. Each wheel suspension provided on the front axle support 18 is a McPherson suspension strut 26. The two transverse links 28 are attached on one side to the axle support 18 and on the other side to the suspension strut 26.

To boost the cooling power, an additional central radiator 30 may optionally be provided between the left and right radiator element 4, 6. The radiator 30 is connected via corresponding hose or pipe connections 32 to the forward and return pipe 16A, 16B of the distributor pipe module 16, and thus incorporated into the cooling circuit. As can be seen in FIG. 1, the hose or pipe connections 32 do not branch off until just before the central radiator 30 in order to minimize the complexity of piping here as well.

The invention claimed is:

1. A motor vehicle comprising:
   a chassis including a front axle support, and a steering gear attached to the front axle support;
   a water-cooled internal combustion engine attached to the chassis, the internal combustion engine designed as a rear engine or as a center engine; and
   a cooling system including a cooling pipe system, at least two radiator elements fluidly communicating with the cooling pipe system for discharging heat produced by the internal combustion engine, and a coolant pump for producing a forced flow in the cooling pipe system and in the radiator elements;
   wherein the cooling pipe system is formed from a plurality of modules and a plurality of quick action couplings that connect the plurality of modules to each other, the plurality of modules include a rear end module, a central module connected to the rear end module, and a distributor pipe assembly, which adjoins with the central module, and which is attached to the front axle support and communicates with the internal combustion engine and the radiator elements;

wherein the radiator elements are located near the front axle support;

wherein the cooling pipe system includes a plurality of coolant conducting pipes; and wherein the a distributor pipe assembly includes a first supply pipe with a branching portion that branches to a first one of the radiator elements and a first return pipe with a branching portion that branches to the first one of the radiator elements;

wherein the distributor pipe assembly includes a second supply pipe with a branching portion that branches to a second one of the radiator elements and a second return pipe with a branching portion that branches to the second one of the radiator elements; and wherein the branching portion of the first supply pipe, the branching portion of the first return pipe, the branching portion of the second supply pipe, and the branching portion of the second return pipe are all located in front of the steering gear as viewed in a direction of travel of the motor vehicle.

2. The motor vehicle as claimed in claim 1, wherein the radiator element mainly transfers heat from the internal combustion engine to ambient air.

3. A method for assembling a motor vehicle having a chassis and an attached water-cooled engine, which comprises:

providing at least two radiator elements of a cooling circuit system near a front of the chassis and providing the cooling circuit with a coolant pump for generating a forced flow in the cooling circuit;

providing the engine near the middle or rear of the chassis;

attaching a distributor pipe module, which is configured to fluidly communicate with the at least two radiator elements and the engine, to a front axle support; and connecting a wheel suspension with a steering gear to the front axle support;

locating the radiator elements at a front part of the motor vehicle such that forward and return lines of the distributor pipe module branch off to a respective one of the radiator elements, the branching being forward, as viewed in a direction of travel, of the steering gear;

forming the cooling pipe system from a plurality of modules and a plurality of quick action couplings that connect the plurality of modules to each other, the plurality of modules include a rear end module a central module, connected to the rear end module, and the distributor pipe module, which adjoins with the central module, and which is attached to the front axle support and communicates with the internal combustion engine and the radiator elements; and providing the cooling pipe system with a plurality of coolant conducting pipes.

4. The method as claimed in claim 3, wherein the step of attaching comprises clamping coolant-conducting pipes to the front axle support.

5. The method as claimed in claim 3, wherein the radiator element mainly transfers heat from the engine to ambient air.

* * * * *